United States Patent [19]
Frankenberger et al.

[11] Patent Number: 4,996,980
[45] Date of Patent: Mar. 5, 1991

[54] VENTILATING TRAINING APPARATUS WITH FAULT SIMULATION

[75] Inventors: Horst Frankenberger, Bad Schwartau; Frank Simon, Emden, both of Fed. Rep. of Germany

[73] Assignee: Drägerwerk Aktiengesellschaft, Lübeck, Fed. Rep. of Germany

[21] Appl. No.: 504,307

[22] Filed: Apr. 4, 1990

[30] Foreign Application Priority Data

Sep. 27, 1989 [DE] Fed. Rep. of Germany ....... 3932188
Sep. 27, 1989 [DE] Fed. Rep. of Germany ....... 8911503

[51] Int. Cl.$^5$ .................. A61M 39/00; G09B 23/28
[52] U.S. Cl. ..................... 128/200.24; 128/202.22; 434/219; 434/262; 434/265; 434/366
[58] Field of Search ............. 128/200.24, 202.22; 434/219, 262, 265, 366

[56] References Cited

U.S. PATENT DOCUMENTS 3,520,071 1/1968 Abrahamson et al. ............. 434/265
4,797,104 1/1989 Laerdal et al. ..................... 434/265

FOREIGN PATENT DOCUMENTS 3049583 7/1982 Fed. Rep. of Germany .
3638192 5/1988 Fed. Rep. of Germany .

*Primary Examiner*—Clifford D. Crowder
*Assistant Examiner*—E. P. Raciti
*Attorney, Agent, or Firm*—Walter Ottesen

[57] ABSTRACT

The invention is directed to a fault triggering component for life-sustaining systems such as ventilating apparatus and anesthesia apparatus. The fault triggering unit is adapted so as to be connectable to or exchangeable with one of the standard plug-in components of the system. The fault triggering unit includes at least one remote-controllable drive member and this drive member is connected to a movable triggering component which triggers at least one fault with its movement. A circuit arrangement for assembling a training program for a ventilating apparatus having a lung simulator is also disclosed.

14 Claims, 5 Drawing Sheets

VENTILATING TRAINING APPARATUS WITH FAULT SIMULATION

FIELD OF THE INVENTION

The invention relates to a fault triggering component for life-sustaining systems such as for ventilating and anesthesia apparatus. The fault triggering component can be connected to or exchanged with an adapted conventional plug-in component of the system. The invention also relates to an advantageous circuit arrangement which utilizes such fault triggering components.

BACKGROUND OF THE INVENTION

Passive and active lung simulators as well as practice dolls are known for training operating personnel in the area of anesthesia. The lung simulators and the exercise dolls aid in learning pathophysiological interrelationships. With equipment of this kind, the most varied breathing forms for controlled ventilation are simulated. In addition, spontaneous breathing and mixed forms of ventilation associated therewith are also simulated.

Pathophysiological disturbances are not the only disturbances which occur in ventilating apparatus and anesthesia devices and when utilizing life-sustaining systems which can be countered by changing the setting of the apparatus. All life-sustaining systems can bring about dangerous situations with apparatus emergencies such as the disengagement of a breathing tube from its connector and these situations too can be countered.

The simulators presently known permit handling of the most different pathological treatment cases and emergency cases. However, these simulators do not offer the possibility of initiating apparatus disturbances and to train the operating personnel in dealing with such disturbances which, in most cases, occur unexpectedly.

SUMMARY OF THE INVENTION

It is an object of the invention to provide a fault triggering component which is suitable for life-sustaining systems and which triggers an appropriate fault which is controlled. It is another object of the invention to provide such a component which is suitable for life-sustaining systems such as ventilating and anesthesia apparatus and which is suitable for connecting to or exchanging with a standard plug-in component.

A life-sustaining system such as a ventilating apparatus and anesthesia apparatus includes standard plug-in components and a fault triggering unit adapted so as to be connectable to or exchangeable with one of the plug-in components. The fault triggering unit includes: a holding structure; a movable triggering component mounted in the holding structure so as to be movable to trigger a fault in the system; and, remotely-controllable drive means for actuating the triggering component to move the triggering component.

The invention is therefore concerned with plug-in components of a life-sustaining system which can be utilized at known disturbance locations of the system or in exchange for an adapted conventional plug-in component and which make possible the remotely-controlled triggering of a defined apparatus fault.

In this way, realistic apparatus fault situations can be simulated and controlled by appropriately training operating personnel. The locations of the faults can be at one or more components of the system such as the wall plugs for pressure gas, connecting elements for breathing tubes, endotracheal tubes, plugs for connecting to the house electrical supply or the like. The fault triggering components according to the invention each initiate an appropriate apparatus fault in a normal or pathological situation.

The invention is concerned with components which are not essentially different from the standard plug-in components and do not affect the normal operation of the system. For this reason, the location of the fault is difficult to detect and is especially suited for the training of emergency situations because of the non-evident activation and an extremely short triggering time (between 20 and 300 milliseconds). After eliminating the fault, the functional readiness of the system is immediately restored. The removal of the fault can be carried out easily and erroneous actions do not lead to a destruction of components in the system.

It is advantageous to configure the driving member as pneumatically or hydraulically remote-controlled because a substantial danger of fire exists for breathing gases having a considerable component of oxygen. Another advantageous embodiment includes an electrically remote-controllable drive unit which, however, cannot be utilized without additional protective measures in breathing gas systems because of the danger caused by a possible spark formation. The application of combined control systems such as pneumatic and hydraulic can also be advantageous. Appropriate fault triggering components can be assembled for one or more faults and their construction can be selected based upon a standard plug-in component.

An advantageous embodiment simulates the disconnection of a tube connection in an apparatus unit provided with a tube-connecting stub. In this embodiment, a slide piston is provided as the drive member and has a push surface which comes into contact engagement against a tube part mounted on the connecting stub. The path of movement of the piston extends up to the throw-off position at which the tube part is pushed from the tube-connecting stub.

A slide piston is disposed in a housing part provided with tube-connecting stubs for simulating a leak in a tube connection. The slide piston has a push surface for coming into contact engagement with a tube part fitted onto a connecting stub. The connecting stub has at least one leakage cutout. By pushing the tube part in the throw-off direction, a leakage cutout is exposed. If required, a plurality of leakage cutouts can be provided arranged one behind the other or leakage cutouts can be provided having respectively different cross section.

For components of this kind, it is advantageous that the slide piston coacts with a spring which resiliently biases the piston into the initial position.

It can furthermore be advantageous to provide an intermediate stop along the displacement path of the slide piston which can be overridden and a detent member which is resiliently biased by a spring element. When actuating the remote-controllable drive member, the tube is first displaced to clear a leakage cutout and, after again actuating the drive member, the intermediate stop is overridden and the slide piston pushed forward to the throw-off position at which the tube part is pushed off.

A constriction in a gas connecting line can occur with a twisting of the tube. To produce this condition, a tube intermediate piece is provided which has connecting stubs for the two tube parts. The one connecting stub is connected to the drive member for carrying out a rotational movement with respect to the other connecting stub.

To produce a disengagement of a plug such as a central supply plug, it can be advantageous to provide a housing part which has a displacing part connected to a part of the plug connection and engaging with the drive member. This displacing part disengages the plug connection when the drive member is driven. The displacing part is displaced only until an interruption of the supply lines occurs and the connection is interrupted without the fault becoming visible by throwing off the plug.

It can be desirable to establish a tube leakage in a ventilating apparatus which coacts with a lung simulator in lieu of a patient in an appropriate training configuration. To bring about this tube leakage, a drive member can be provided in combination with a pump device by means of which air can be drawn from the ventilating bellows. In this way, a tube leakage of the ventilating apparatus is simulated.

Such fault simulating components are advantageously utilized in a circuit arrangement which corresponds to the standard system configuration. It is advantageous to provide a control unit to trigger individual faults or fault combinations manually and/or via a program control. For such a program control, a computer is suitable which is provided with an appropriate software program. The computer makes possible the most different time-dependent operational sequences of individual and combined fault cases in the context of a defined teaching program.

Fault triggering components of the kind described above are utilized for known fault cases with which even rare fault situations can be simulated. Complete training systems can be assembled in combination with the training for pathogenic conditions in which apparatus faults corresponding to actual conditions as well as pathogenic situations can be run through pursuant to a predetermined program control and the person being trained must eliminate these faults with clinically correct countermeasures. In this way, a total training program is provided which considers not only the physiological characteristics of the patient but considers also apparatus faults which occur by chance or which can occur expectedly.

Control valves in breathing systems can be configured as fault triggering components as they are utilized, for example, in anesthesia apparatus as inhale and exhale valves. In this connection, the drive member in the form of an actuable piston can lift the membrane (made of mica, ceramic or metal) so that permanent leakages and therefore faults can occur. A further possibility of the application of controllable valves are water traps in breathing systems wherein additional disconnections in the breathing system can occur by means of pneumatically controllable piston elements. These disconnections can be in breathing systems of anesthesia and ventilating apparatus and can include the passage of water from the water traps. A further area of application are infusion apparatus and infusion pumps.

A further possible application of the system relates to the supply of breathing gas for underwater laboratories and the like as well as overpressure chambers and other life-sustaining systems such as for space vehicles.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
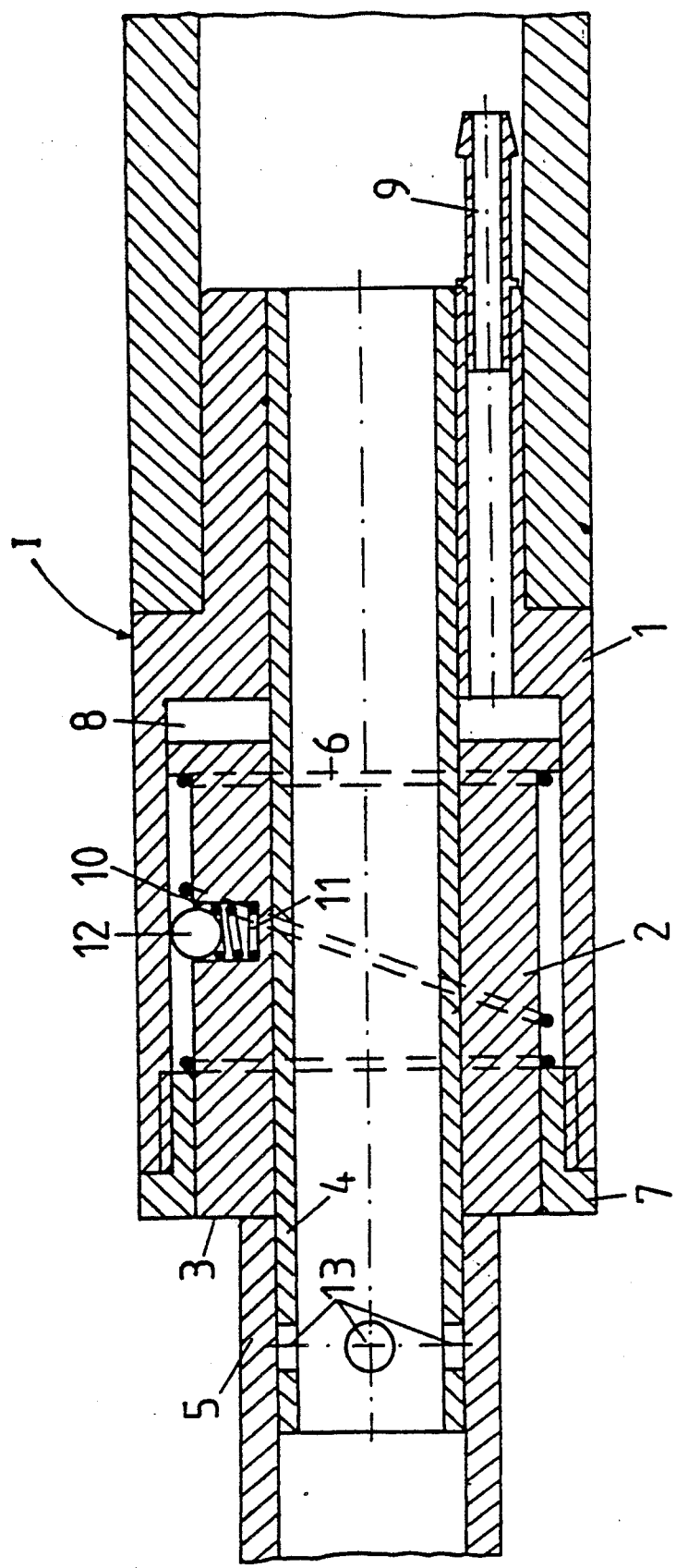
FIG. 1 is a section view taken through a component (I) for simulating the fault condition wherein a tube slips off a connecting stub and for simulating the fault wherein a leak occurs in the breathing tube.

FIG. 1 shows a fault triggering component I which causes a leak and the disconnection of a breathing tube. A drive member in the form of a slide piston 2 is journalled in a housing 1. The slide piston 2 has a push surface 3 which lies against a tube part 5 of a breathing gas tube fitted over the connecting stub 4. A compression spring 6 is supported at one end against the slide piston 2 and with a second end, the spring lies against an insert member 7 which is threadably secured in the housing 1. The spring resiliently biases the slide piston into its start position. The cylinder chamber 8 ahead of the slide piston communicates with a connector 9 through which compressed air is supplied.

A blind bore 10 is formed in the slide piston 2 and a detent ball 12 is journalled in the blind bore 10 and is resiliently biased by a tension spring 11. The ball 12 defines an intermediate stop along the stroke path of the piston and can be overridden by pushing the slide piston 2 forward. In this way, the slide piston can first be pushed forward until the ball 12 lies against the insert part 7. With this movement sequence, only the leakage cutouts 13 in the connecting stub 4 are cleared. By driving the slide piston 2 further, the ball 12 overrides the intermediate stop and the breathing gas tube is completely thrown off.

Figure 2:
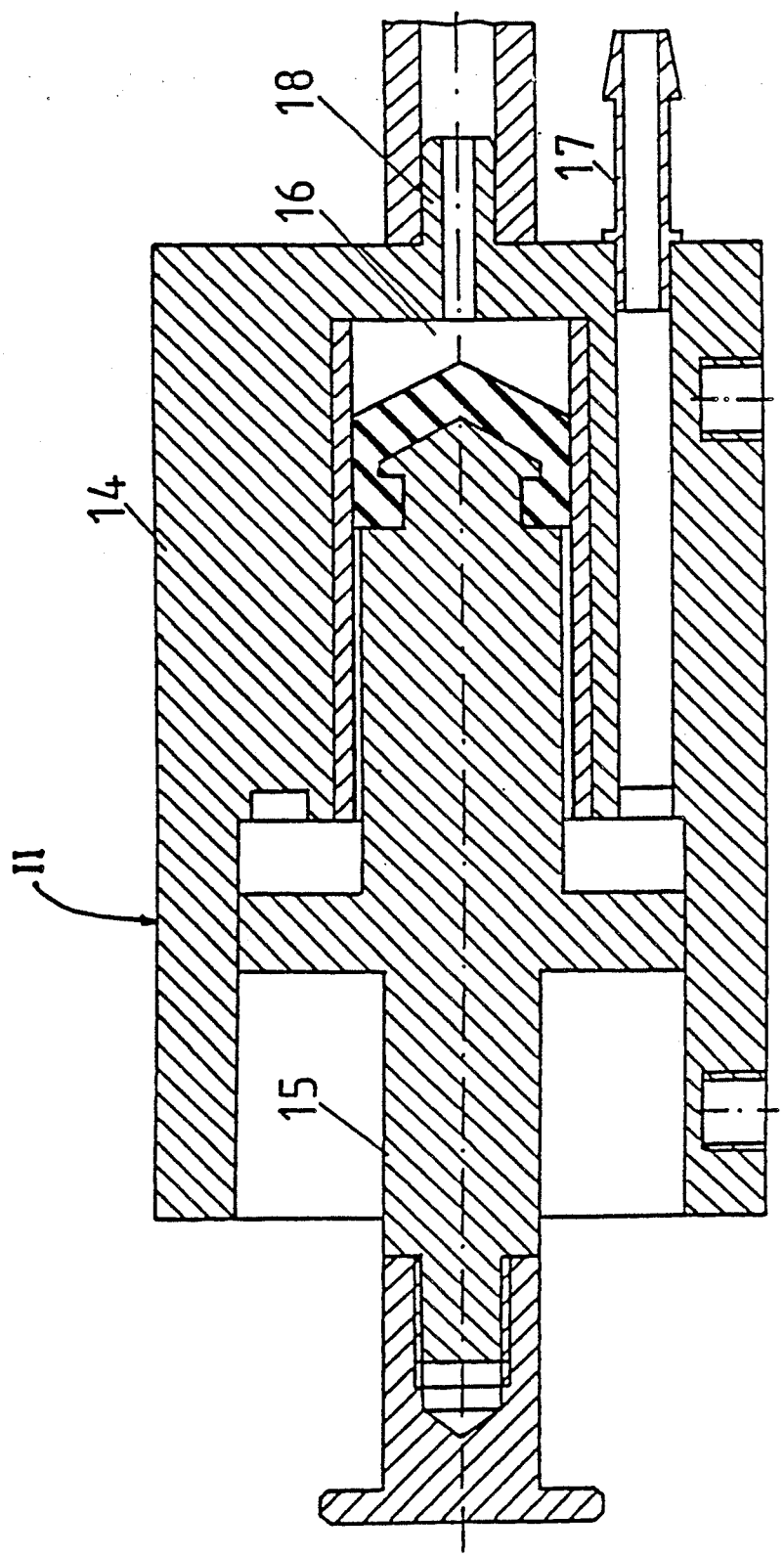
FIG. 2 is a section taken through a component (II) for triggering a tube leak.

FIG. 2 shows a component II for simulating a tube leak. A slide piston 15 journalled in a housing 14 functions as the drive member. The slide piston 15 defines a suction chamber 16 with the housing 14 and is actuated via a compressed air connector 17. The suction chamber 16 of the slide piston 15 is connected to the tube of a lung simulator via a connector 18. A tube leak is generated by drawing off air from the endotracheal tube.

Figure 3:
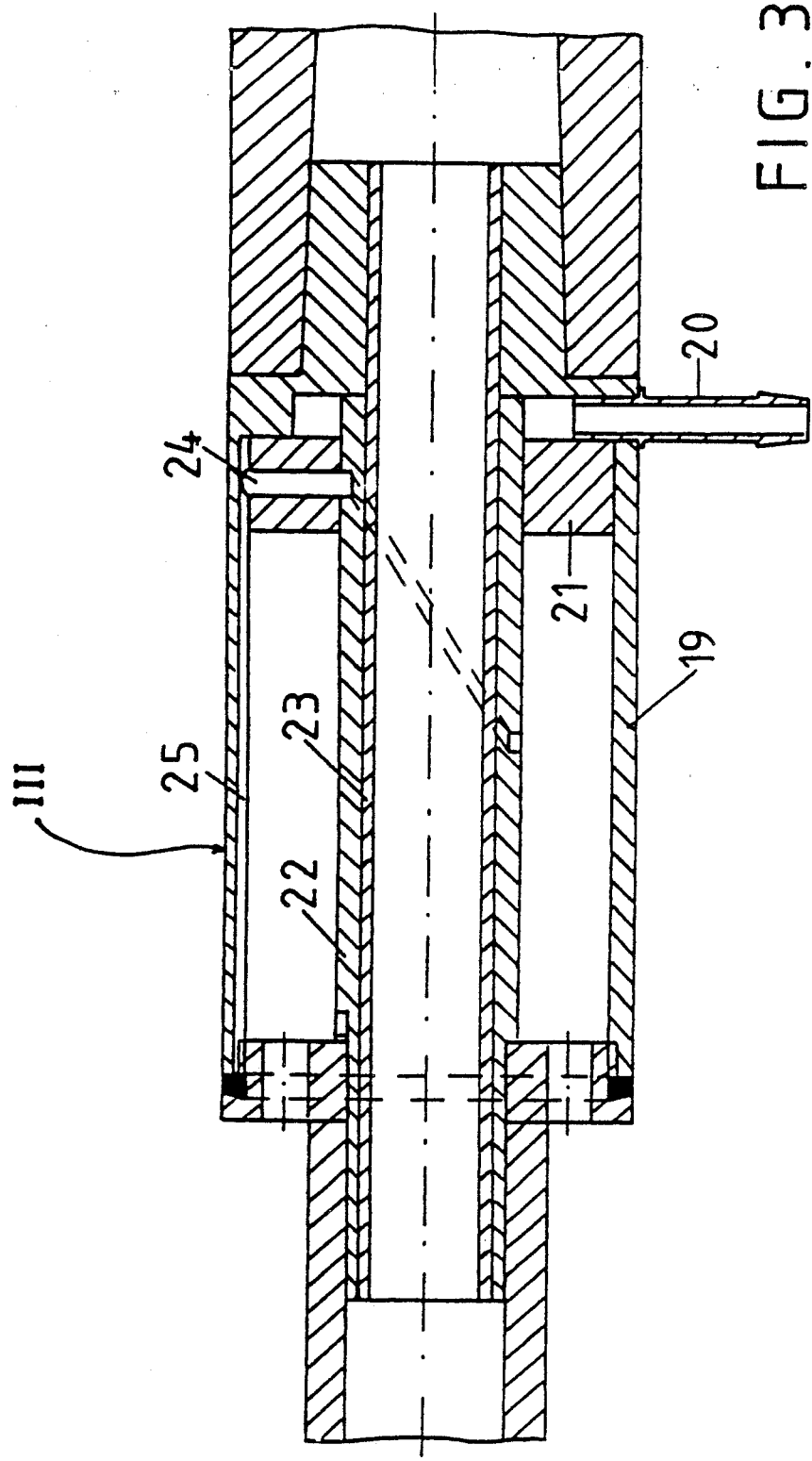
FIG. 3 is a section view of a component (III) for triggering a constriction of the breathing tube.

The component III shown in FIG. 3 simulates the constriction of a breathing tube by twisting. A drive member in the form of a slide piston 21 is journalled in a housing 19 having a compressed air connection 20. The translatory movement of the slide piston 21 is converted to a rotary movement of the shaft by means of the nut 25 and the pin 24. The pin 24 is operatively connected to the spindle-shaped shaft 22 which is slideably journalled on the sleeve 23. This results in a rotational movement of the spindle-shaped shaft 22. This rotation is almost 360° and effects a constriction of the mounted breathing tube.

Figure 4:
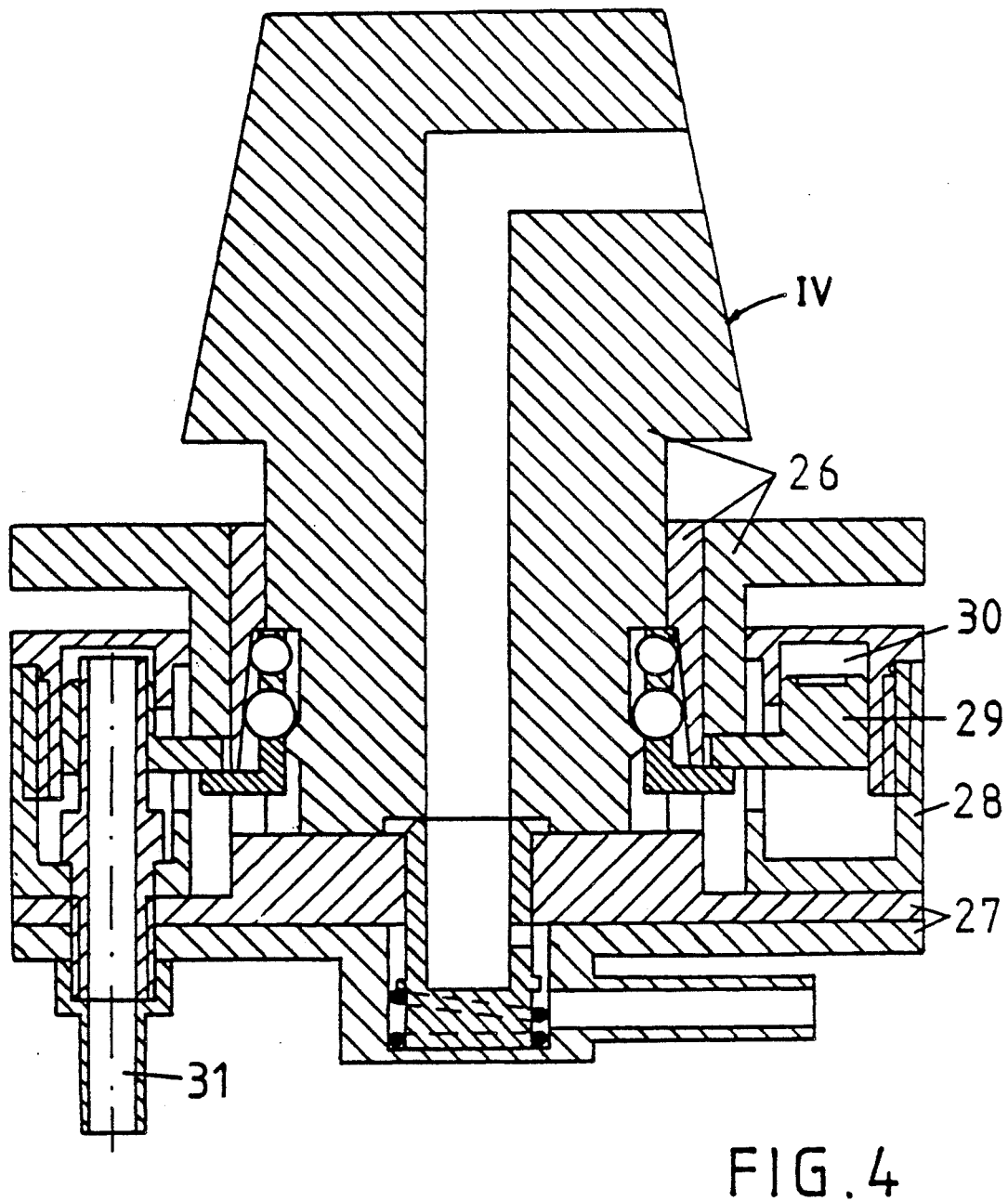
FIG. 4 is a section view of a component (IV) for causing a central supply plug to be disconnected; and, FIG. 5 is a circuit diagram of a ventilating system including a lung simulator, ventilating apparatus and several fault triggering components.

The component IV shown in FIG. 4 relates to the disengagement of the central supply connector unit which comprises connector parts 26 and 27. These connector components (26, 27) are disposed in a housing 28 wherein a slider piston 29 is journalled for separating the plug connection. The cylinder chamber 30 above the slide piston 29 communicates with a compressed air connector 31 for driving the slide piston 29 which operates as a slider component. The plug halves are separated by an appropriate displacing movement and the connection is disengaged. The original functional operation of the manually insertable and disconnectable plug connection is maintained.

Figure 5:
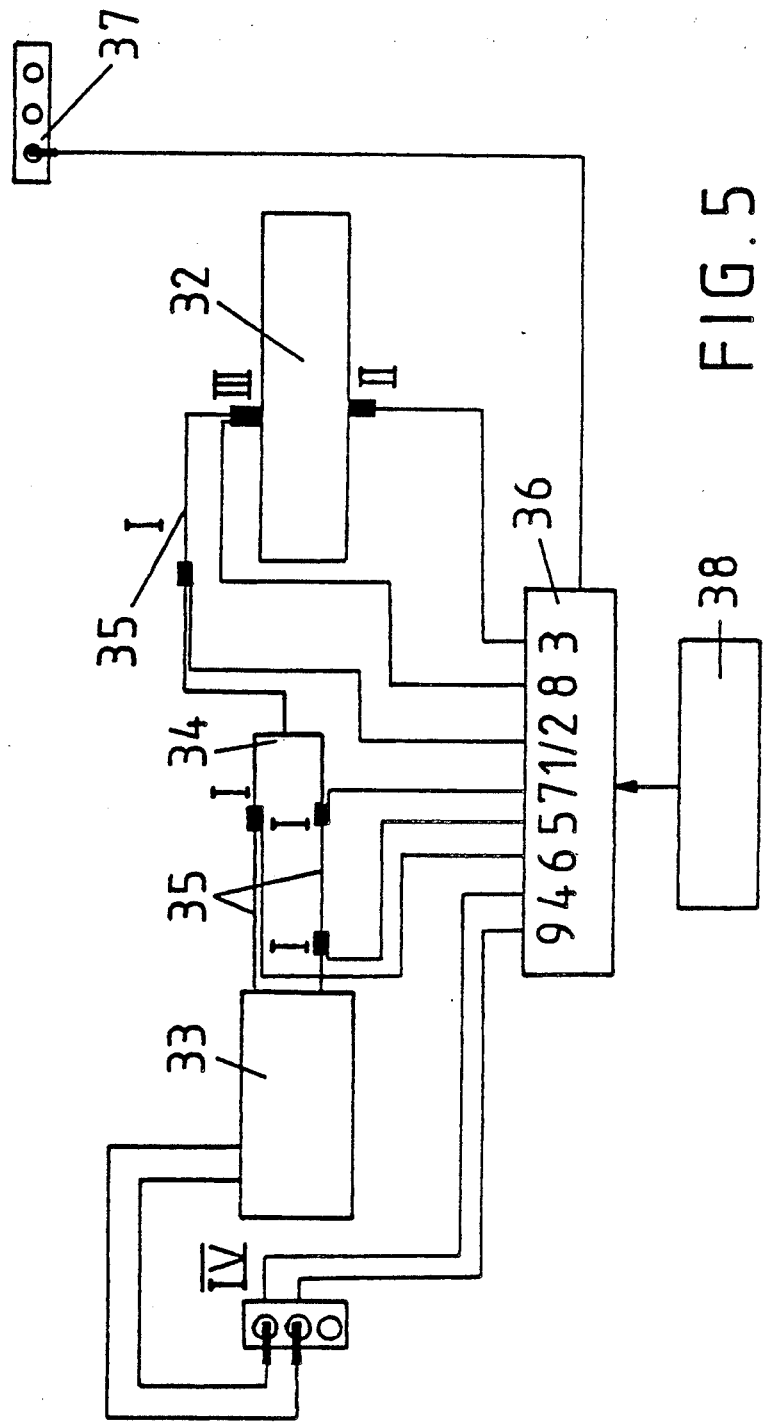

Finally, FIG. 5 shows a circuit arrangement wherein the individual fault triggering components (I, II, III, IV) are shown incorporated into a ventilating system.

The lung simulator 32 simulates the patient and the ventilating system includes this simulator in combination with a ventilating apparatus 33 which is connected to the lung simulator 32 via a Y-shaped connecting piece 34 via a tube connection 35. The individual components (I, II, III, IV) are actuated via a pneumatic driving unit 36 which is connected to a compressed air supply 37. The control orders are issued by a computer 38 pursuant to an appropriate program.

It is understood that the foregoing description is that of the preferred embodiments of the invention and that various changes and modifications may be made thereto without departing from the spirit and scope of the invention as defined in the appended claims.

What is claimed is:

1. A ventilating apparatus comprising standard plug-in components, a fault triggering unit adapted so as to be connectable to or exchangeable with one of the plug-in components, the fault triggering unit including:
   a holding structure;
   a movable triggering component mounted in said holding structure so as to be movable to trigger a fault in the apparatus; and,
   remotely-controllable drive means for actuating said triggering component to move said triggering component.

2. The ventilating apparatus of claim 1, said drive means including: a drive member movably journalled in said holding structure so as to be movable between a first position corresponding to a normal operation of said apparatus and a second position corresponding to said fault; and, remotely-controlled actuating means for actuating said drive member for movement between said positions.

3. The ventilating apparatus of claim 2, said actuating means being a pneumatically remote-controlled actuating means.

4. The ventilating apparatus of claim 2, said actuating means being a hydraulically remote-controlled actuating means.

5. The ventilating apparatus of claim 2, said actuating means being an electrically remote-controlled actuating means.

6. The ventilating apparatus of claim 1, said holding structure being a housing having a connecting stub and said triggering component being a tube fitted over said connecting stub to define a tube connection; said drive means including a slide piston slideably journalled in said housing so as to be movable between a first position corresponding to a normal operation of said apparatus and a second position corresponding to a fault condition; and, said slide piston having a push surface for contact engaging said tube and for pushing said tube completely off said connecting stub when said slide piston reaches said second position.

7. The ventilating apparatus of claim 6, said fault triggering unit further comprising resilient biasing means for resiliently biasing said slide piston into said first position.

8. The ventilating apparatus of claim 6, further comprising overrideable detent means defining an intermediate position between said first and second positions; said connecting stub having a leakage cutout formed therein; said slide piston being slideably journalled in said housing so as to be movable between said first position and said intermediate position to push said tube along said connecting stub so as to clear said leakage cutout when said slide piston reaches said intermediate position thereby simulating a leak in said tube connection.

9. The ventilating apparatus of claim 1, said holding structure being a housing having a connector stub mounted thereon; said connector stub having a leakage cutout formed therein and said triggering component being a tube fitted over said connecting stub to define a tube connection therewith; said drive means including a slide piston slideably journalled in said housing so as to be movable between a first position corresponding to a normal operation of said system and a second position corresponding to a fault condition; and, said slide piston having a push surface for contact engaging said tube and for pushing said tube along said stub so as to clear said leakage cutout when said slide piston reaches said second position thereby simulating a leak in said tube connection.

10. The ventilating apparatus of claim 9, said fault triggering unit further comprising resilient biasing means for resiliently biasing said slide piston into said first position.

11. The ventilating apparatus of claim 1, said system including a first connecting stub and said holding structure being a housing having a second connecting stub mounted thereon; said triggering component being a tube segment having respective longitudinal ends fitted onto corresponding ones of said connecting stubs; and, said drive means being operatively connected to one of said connecting stubs for imparting a rotational movement thereto so as to rotate said one connecting stub relative to the other one of said connecting stubs thereby simulating a constriction in said tube segment.

12. The ventilating apparatus of claim 1, wherein the system has a central supply plug connector unit having first and second connector parts for defining a connection; said triggering component being said first connector part and said drive means including a drive member movably journalled in said holding structure so as to be movable between a first position corresponding to a normal operation of said apparatus and a second position corresponding to said fault; said drive member being operatively connected to said first connector part so as to displace the latter when said drive member is moved from said first position to said second position thereby simulating an interruption of said connection.

13. A circuit arrangement comprising:
   gas supply means;
   a ventilating apparatus;
   a lung simulator;
   connecting means for connecting said ventilating apparatus to said lung simulator;
   a plurality of fault triggering units disposed on selected ones of said gas supply means, said ventilating apparatus, said lung simulator and said connecting means for simulating one or more faults therein;

and, control means connected to said gas supply means for actuating one or more of said fault triggering units to simulate said one or more faults.

14. The circuit arrangement of claim 13, further comprising computer means connected to said control means for triggering one or a combination of said faults.

* * * * *